Dec. 6, 1927.
W. W. HICKS
1,651,890
CONVECTION HEATER
Filed Nov. 14, 1924
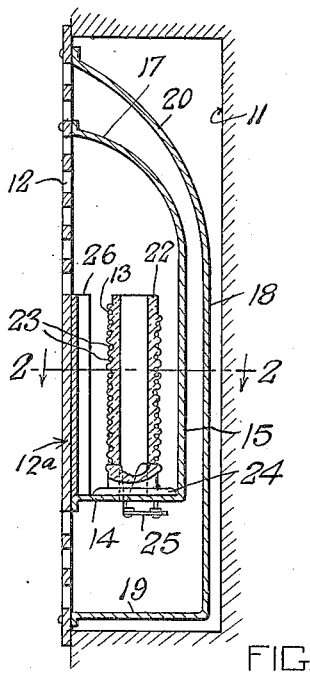
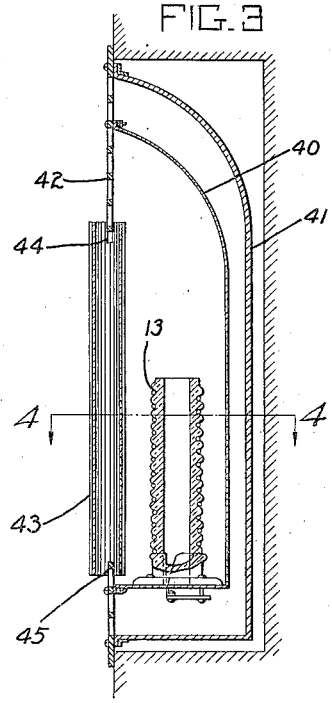
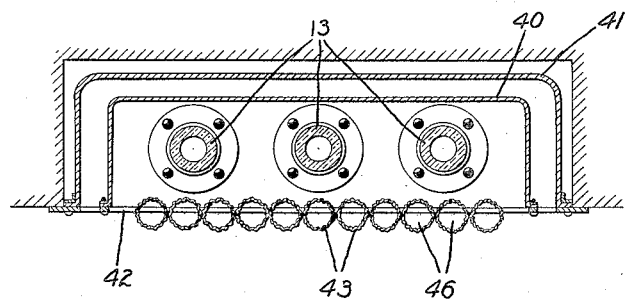
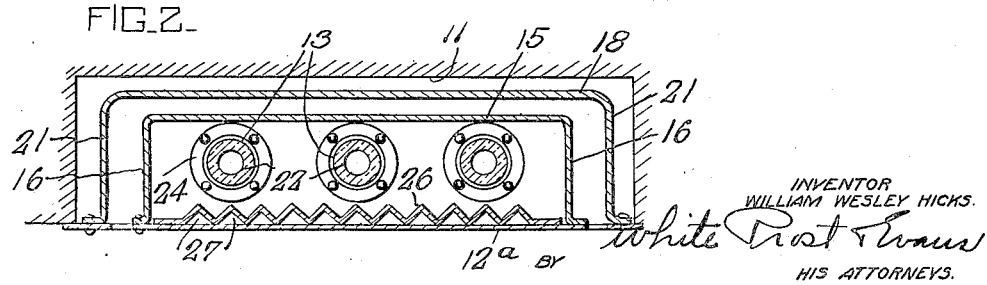
INVENTOR
WILLIAM WESLEY HICKS.
White Frost Evans
HIS ATTORNEYS.

Patented Dec. 6, 1927.

1,651,890

UNITED STATES PATENT OFFICE.

WILLIAM WESLEY HICKS, OF SAN FRANCISCO, CALIFORNIA.

CONVECTION HEATER.

Application filed November 14, 1924. Serial No. 749,866.

This invention relates generally to electrical air heaters of the type which utilize one or more electrical heating elements adapted to operate at a radiating temperature. A heater of this kind is shown for example in my Patent No. 1,518,067, issued September 2, 1924.

It is an object of this invention to devise an electrical air heater incorporating novel means for minimizing direct radiation of heat from the same whereby high heating over a restricted area is prevented.

It is a further object of this invention to devise a baffle for absorption of radiant heat from an electric air heater, which baffle will serve to impart the heat absorbed to convection currents of air.

It is a further object of this invention to devise novel means for intercepting radiant heat in combination with an electrical air heater of the open grill type.

My invention possesses other advantageous features, some of which with the foregoing, will be set forth at length in the following description, where I shall outline in full those forms of the invention which I have selected for illustration in the drawings accompanying and forming part of the present application. Although I have shown in the drawings but several embodiments of my invention, I do not desire to be limited thereto, since the invention as expressed in the claims, may be embodied in other forms also.

Referring to the drawings:

Figure 1 is a sectional view of a heater embodying my invention, and shown as installed in the wall of a room or the like;

Fig. 2 is a sectional view of the heater shown in Fig. 1, the section being taken along plane 2—2;

Fig. 3 is a vertical sectional view of a modified form of heater construction;

Fig. 4 is a sectional view along plane 4—4 of Fig. 3.

Referring first to Figs. 1 and 2, the heater is shown as mounted in a recess 11 of a vertical wall. The front of the recess is covered by a grill 12, appropriately held in place with respect to the wall. Behind the grill 12 the heating elements 13 are supported, as by the aid of a horizontal shelf 14 fastened to the back of the grill 12. This shelf has a vertical projection 15 which rises back of the elements 13, and also provides sides 16 (Fig. 2), whereby the heater elements 13 are encompassed by the grill 12 and the vertical walls 15 and 16. The rear wall 15 curves over the top of the elements as shown at 17 of Fig 1, and is attached to the rear side of the grill 12. This curved portion, as well as the vertical walls 15 and 16 serve to define an air passageway leading from the bottom of the grill 12, then back of the elements 13 and up to the top of grill 12. The rear wall of the passageway is formed by a sheet metal backing having a vertical wall 18, as well as a horizontal projection 19 connecting it to the rear surface of the grill 12. Its upper end 20 is curved forwardly to meet the upper portion of grill 12 and also to form a flaring and smooth passageway for the current of heated air. Side plates 21 are also provided, spaced from the side 16 whereby the air passage has a U-shaped section, as most clearly shown in Fig. 2.

As thus far described, it is evident that the air passageway in the rear of the elements 13, communicates with both the top and bottom portion of the grill 12, and forms the path for the cold air taken in at the bottom, which on being heated, is expelled near the top of the grill 12. In this manner, convection currents of heated air are sent up, due to the passage of this air near adjacent heated portions of the device.

The elements 13 are most conveniently supported on the horizontal portion 14. In the present instance we show these elements as each comprising a hollow tubular member 22 of refractory material, as the supports for the resistance coils 23 wound in grooves on its periphery. The member 22 has a flange or base 24 by the aid of which it may be fastened to the portion 14. The connections for the heater elements 13 may be most conveniently effected by the aid of a connection board 25, supported beneath the horizontal portion 14. In this portion 14 there are apertures that register with the apertures through the support 22, and in this way, another passage for air is provided. This passageway extends from the lower portion of grill 12, through the elements 13, and out again some distance below the top portion of grill 12. The air is rapidly heated in passing through elements 13, some at least impinging against the curved portion 17. This portion thus acts as a deflector; in addition, a large amount of heat is transferred to this curved portion, and the air in the rear passageway takes up some of this heat before passing out at the top of grill 12.

In prior devices, the elements 13 were arranged to be visible through the interstices of the grill 12, whereby radiant heat would be produced that would affect the space to be heated. Such an arrangement is at times objectionable, for then near the grill an unpleasantly high degree of heat may be experienced. Although in an ordinary home this would simply necessitate a rearrangement of the position of the occupants of the room, such a remedy is not available for example in schools or churches, where the occupants are intended to remain for long periods in their seats. The use of radiant heat alone may affect the safety of the installation, especially when the heater as in this form, is placed in a recess in a wall. Under such circumstances, the convection currents serve to keep the heater walls below dangerous temperatures, the heat being rapidly conducted away.

In this invention substantially all of the heat directly radiated from the heating elements is intercepted and is imparted to convection currents of air. For this purpose a special form of baffle is provided which extends in front of the electrical heating elements. It is constructed in such a manner that convection currents of air may pass upwardly between its inner and outer faces whereby the radiant heat absorbed by the baffle is imparted to convection currents of air. Thus referring to Figs. 1 and 2, there is provided a baffle including an inner member 26 and an outer member 12$^a$, both being preferably constructed of suitable metal. To simplify manufacture member 12$^a$ is formed as an integral part of the grill 12. Member 26 is preferably formed as a corrugated metal sheet as shown whereby a plurality of upstanding flues 27 are formed between the inner and outer faces of the baffle to permit passage of convection currents of air. Member 26 is preferably provided with a reflecting surface so that a portion of the heat striking the baffle is reflected back into the heater housing while the remainder is absorbed and imparted to convection currents of air. The baffle preferably extends across the housing in front of the electrical heating elements but does not obstruct passage of convection currents thru the upper and lower portions of the grill 12. The convection currents of air which are induced to pass thru the flues 27 not only carry away the radiated heat absorbed but likewise serve to keep the external surface of the baffle at a relatively low surface temperature.

It is preferable in some instances to make the member 26 serve more efficiently as an absorber of radiant heat whereby more heat may be imparted therefrom to the currents of air passing thru flues 27. By making member 26 corrugated, a large absorbing surface is presented, and its rate of heat exchange as regards the convection currents in flues 27 is correspondingly made greater.

The efficiency of a heater such as described above is relatively high due to the novel and efficient manner in which heat is carried away by convection currents of air, and the manner in which radiant heat is intercepted does not produce a perceptible increase in the temperature of the back and top walls 18 and 20. This is an important advantage, especially where the invention is incorporated with an electrical heater of the wall type such as shown.

In the modification illustrated in Figs. 3 and 4, the heaters 13 and the deflectors 40 and 41 are arranged substantially as in Figs. 1 and 2. The grill 42 is however cut away substantially entirely over the entire front of the heater. In the cut away portion there is positioned a baffle which is also provided with vertical flues. This baffle comprises a plurality of closely set corrugated tubes 43 vertically supported, which serve to shield the elements 13 from direct radiation. These tubes are slotted diametrically both at the top and bottom, as indicated at 44 and 45 in Fig. 6. The edges of the grill 42 enter into the slots, and thus support the tubes 43. The upper slot 44 is cut deep enough to permit the tube to be lifted clear of the lower edge of the aperture in front of elements 13, and thus to permit ready assembly of the parts.

The tubes 43 are long enough to shield the elements 13 effectively. They also form a plurality of vertical flues or passageways 46 which convey currents of air adjacent the heaters 13. The tubes being corrugated, a large superficial area is provided for absorbing the heat and for increasing its heat exchange capacity; thus, the external surfaces of the tubes 43 never attain a temperature high enough to be unpleasant to the touch or harmful.

It is evident that the two forms of the invention described have the common feature, that the heating elements are effectively shielded against direct radiation. The front of the recess 11 has apertures which provide circulation only for the air in and around the heater elements. Little if any direct radiated heat emanates from them, and there is therefore an assurance that there will be no high localized heating adjacent the heater after it is installed.

While I have described my invention as embodied in wall type heaters, it is to be understood that I do not limit myself thereto since the same may be used in other locations as well as in portable types of heaters.

I claim:

1. In an air heater, a housing, a grill secured to the front of the housing and apertured to allow circulation of air into and out of said housing, electrical heating means disposed within said housing, and a baffle extending in front of said means to prevent direct radiation of heat to the exterior of said housing, said baffle being formed to provide a series of open ended flues for the passage of convection currents of air.

2. In an air heater, a housing, electrical heating means within said housing, a shell enclosing said heating means, said shell being spaced from said housing, a grill having upper and lower openings and secured to the front of said housing and adapted to allow convection currents of air to pass into contact with said heating elements and between the shell and housing, a baffle extending in front of said heating means intercepting direct radiant heat from said heating elements, and means for allowing convection currents of air to pass upward between the outer and inner faces of said baffle whereby radiant heat which is absorbed by the baffle is effectively imparted to the air.

3. An electric air heater comprising a housing, an electrical heating element disposed within said housing, and a baffle for intercepting radiant heat from said element, said baffle being formed to provide a plurality of open ended flues for passage of convection currents of air.

In testimony whereof, I have hereunto set my hand.

WILLIAM WESLEY HICKS.